US010972413B2

United States Patent
Pamidiparthi

(10) Patent No.: US 10,972,413 B2
(45) Date of Patent: *Apr. 6, 2021

(54) SYSTEM AND METHOD FOR MONITORING, BLOCKING ACCORDING TO SELECTION CRITERIA, CONVERTING, AND COPYING MULTIMEDIA MESSAGES INTO STORAGE LOCATIONS IN A COMPLIANCE FILE FORMAT

(71) Applicant: Commvault Systems, Inc., Tinton Falls, NJ (US)

(72) Inventor: Sandeep Naidu Pamidiparthi, Telangana (IN)

(73) Assignee: Commvault Systems, Inc., Tinton Falls, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/788,038

(22) Filed: Feb. 11, 2020

(65) Prior Publication Data

US 2020/0204509 A1    Jun. 25, 2020

Related U.S. Application Data

(63) Continuation of application No. 16/112,532, filed on Aug. 24, 2018, now Pat. No. 10,601,746, which is a (Continued)

(51) Int. Cl.
*H04L 12/58* (2006.01)
*G06Q 10/10* (2012.01)
(Continued)

(52) U.S. Cl.
CPC .......... *H04L 51/063* (2013.01); *G06F 16/116* (2019.01); *G06F 16/258* (2019.01);
(Continued)

(58) Field of Classification Search
CPC ....... H04L 51/063; H04L 41/22; H04L 51/14; G06F 40/151; G06F 16/116; G06F 16/258; G06Q 10/107; G06Q 10/10
See application file for complete search history.

(56) References Cited

U.S. PATENT DOCUMENTS 4,837,798 A    6/1989    Cohen et al.
5,093,912 A    3/1992    Dong et al.
(Continued)

FOREIGN PATENT DOCUMENTS

EP    0259912    3/1988
EP    0405926    1/1991
(Continued)

OTHER PUBLICATIONS

Arneson, "Mass Storage Archiving in Network Environments" IEEE, 1998, pp. 45-50.
(Continued)

*Primary Examiner* — Daniel C. Murray
(74) *Attorney, Agent, or Firm* — Knobbe, Martens, Olson & Bear, LLP

(57) ABSTRACT

The present inventions relate systems and methods for monitoring and managing electronic messages in one or more computer networks. More particularly, the systems and methods of the present invention provide a substantially global or unified approach to messaging management within one or more computer networks that allows network administrators or other authorized users to define and identify electronic messages of interest within the network and store selected messages such that they can be retrieved and examined in connection with an audit or other inquiry.

20 Claims, 2 Drawing Sheets

Related U.S. Application Data continuation of application No. 14/863,866, filed on Sep. 24, 2015, now Pat. No. 10,091,146, which is a continuation of application No. 12/612,359, filed on Nov. 4, 2009, now Pat. No. 9,178,842.

(60) Provisional application No. 61/111,410, filed on Nov. 5, 2008.

(51) Int. Cl.
| | |
|---|---|
| G06F 16/11 | (2019.01) |
| G06F 16/25 | (2019.01) |
| G06F 40/151 | (2020.01) |
| H04L 12/24 | (2006.01) |

(52) U.S. Cl.
CPC ........... *G06F 40/151* (2020.01); *G06Q 10/10* (2013.01); *G06Q 10/107* (2013.01); *H04L 41/22* (2013.01); *H04L 51/14* (2013.01)

(56) References Cited

U.S. PATENT DOCUMENTS

| | | | |
|---|---|---|---|
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,301,286 | A | 4/1994 | Rajani |
| 5,321,816 | A | 6/1994 | Rogan et al. |
| 5,347,653 | A | 9/1994 | Flynn et al. |
| 5,377,354 | A | 12/1994 | Scannell et al. |
| 5,410,700 | A | 4/1995 | Fecteau et al. |
| 5,420,996 | A | 5/1995 | Aoyagi |
| 5,448,724 | A | 9/1995 | Hayashi et al. |
| 5,454,099 | A | 9/1995 | Myers et al. |
| 5,559,991 | A | 9/1996 | Kanfi |
| 5,642,496 | A | 6/1997 | Kanfi |
| 5,978,846 | A | 11/1999 | Kimishima |
| 6,233,318 | B1 | 5/2001 | Picard et al. |
| 6,295,561 | B1 | 9/2001 | Nagy |
| 6,418,478 | B1 | 7/2002 | Ignatius et al. |
| 6,542,972 | B2 | 4/2003 | Ignatius et al. |
| 6,650,890 | B1 | 11/2003 | Irlam et al. |
| 6,658,436 | B2 | 12/2003 | Oshinsky et al. |
| 6,721,767 | B2 | 4/2004 | De Meno et al. |
| 6,738,378 | B2 | 5/2004 | Tuck, III et al. |
| 6,745,194 | B2 | 6/2004 | Burrows |
| 6,760,723 | B2 | 7/2004 | Oshinsky et al. |
| 6,880,005 | B1 | 4/2005 | Bell et al. |
| 6,912,378 | B2 | 6/2005 | Morewitz, II et al. |
| 7,003,641 | B2 | 2/2006 | Prahlad et al. |
| 7,027,463 | B2 * | 4/2006 | Mathew ................ G06Q 10/10 370/395.32 |
| 7,035,880 | B1 | 4/2006 | Crescenti et al. |
| 7,103,046 | B2 | 9/2006 | Tuck, III et al. |
| 7,103,154 | B1 | 9/2006 | Cannon et al. |
| 7,130,970 | B2 | 10/2006 | Devassy et al. |
| 7,133,660 | B2 | 11/2006 | Irlam et al. |
| 7,162,496 | B2 | 1/2007 | Amarendran et al. |
| 7,174,433 | B2 | 2/2007 | Kottomtharayil et al. |
| 7,236,769 | B2 | 6/2007 | Irlam et al. |
| 7,246,207 | B2 | 7/2007 | Kottomtharayil et al. |
| 7,257,833 | B1 | 8/2007 | Parekh et al. |
| 7,272,378 | B2 | 9/2007 | Petry et al. |
| 7,277,695 | B2 | 10/2007 | Petry et al. |
| 7,315,923 | B2 | 1/2008 | Retnamma et al. |
| 7,343,453 | B2 | 3/2008 | Prahlad et al. |
| 7,376,661 | B2 | 5/2008 | Larson |
| 7,428,410 | B2 | 9/2008 | Petry et al. |
| 7,653,394 | B2 | 1/2010 | McMillin |
| 7,689,709 | B2 | 3/2010 | Surma et al. |
| 7,761,498 | B2 | 7/2010 | Petry et al. |
| 7,886,359 | B2 | 2/2011 | Jones et al. |
| 7,903,549 | B2 * | 3/2011 | Judge ..................... H04L 51/12 370/230 |
| 8,015,318 | B2 | 9/2011 | Kosaka et al. |
| 8,028,030 | B2 | 9/2011 | Edlund et al. |
| 8,073,911 | B2 | 12/2011 | Marston et al. |
| 8,285,681 | B2 | 10/2012 | Prahlad et al. |
| 8,307,177 | B2 | 11/2012 | Prahlad et al. |
| 8,364,652 | B2 | 1/2013 | Vijayan et al. |
| 8,370,542 | B2 | 2/2013 | Lu et al. |
| 8,396,838 | B2 | 3/2013 | Brockway et al. |
| 8,484,733 | B2 * | 7/2013 | Pirzada ............... H04L 63/1408 726/23 |
| 8,578,120 | B2 | 11/2013 | Attarde et al. |
| 8,607,325 | B2 | 12/2013 | Kennedy |
| 8,799,243 | B1 | 8/2014 | Havlik |
| 8,843,117 | B2 | 9/2014 | Sigmund et al. |
| 8,910,054 | B2 | 12/2014 | Montagna et al. |
| 8,934,611 | B2 | 1/2015 | Doulton |
| 9,043,926 | B2 | 5/2015 | Hart |
| 9,178,842 | B2 | 11/2015 | Pamidiparthi |
| 9,384,735 | B2 | 7/2016 | White et al. |
| 9,391,931 | B2 | 7/2016 | Goldfinger |
| 9,405,486 | B2 | 8/2016 | Miller et al. |
| 9,405,763 | B2 | 8/2016 | Prahlad et al. |
| 9,436,749 | B2 | 9/2016 | Patron et al. |
| 9,454,537 | B2 | 9/2016 | Prahlad et al. |
| 9,461,957 | B2 | 10/2016 | Chang et al. |
| 9,509,652 | B2 | 11/2016 | Ahn et al. |
| 9,860,348 | B2 | 1/2018 | Eisner et al. |
| 10,049,368 | B2 | 8/2018 | Hansen et al. |
| 10,091,146 | B2 | 10/2018 | Pamidiparthi |
| 10,601,746 | B2 | 3/2020 | Pamidiparthi |
| 10,630,631 | B1 * | 4/2020 | Yague .................... H04L 51/12 |
| 10,742,688 | B2 * | 8/2020 | Parry .................... H04L 63/20 |
| 2001/0039576 | A1 | 11/2001 | Kanada |
| 2002/0053004 | A1 | 5/2002 | Pong |
| 2002/0059382 | A1 | 5/2002 | Yamaguchi et al. |
| 2002/0069200 | A1 | 6/2002 | Cooper et al. |
| 2002/0173283 | A1 | 11/2002 | Morewitz et al. |
| 2003/0039258 | A1 | 2/2003 | Tuck, III et al. |
| 2003/0120502 | A1 | 6/2003 | Robb et al. |
| 2003/0126214 | A1 | 7/2003 | Oliszewski |
| 2003/0131011 | A1 | 7/2003 | Haunschild et al. |
| 2003/0217036 | A1 | 11/2003 | Haunschild et al. |
| 2004/0015132 | A1 | 1/2004 | Brown |
| 2004/0017904 | A1 | 1/2004 | Williams et al. |
| 2004/0058673 | A1 | 3/2004 | Irlam et al. |
| 2004/0117428 | A1 | 6/2004 | Surma et al. |
| 2004/0194107 | A1 | 9/2004 | Masuoka |
| 2004/0208178 | A1 | 10/2004 | Tuck, III et al. |
| 2004/0260710 | A1 | 12/2004 | Marston et al. |
| 2005/0060417 | A1 * | 3/2005 | Rose ..................... H04L 67/30 709/228 |
| 2005/0064850 | A1 | 3/2005 | Irlam et al. |
| 2005/0108316 | A1 | 5/2005 | Cantu et al. |
| 2005/0266832 | A1 | 12/2005 | Irlam et al. |
| 2006/0031340 | A1 * | 2/2006 | Mathew .................. H04L 51/14 709/206 |
| 2006/0031351 | A1 | 2/2006 | Marston et al. |
| 2006/0085543 | A1 | 4/2006 | Hrastar et al. |
| 2006/0123048 | A1 | 6/2006 | Larson |
| 2006/0155808 | A1 | 7/2006 | Irlam et al. |
| 2006/0178136 | A1 | 8/2006 | Irlam et al. |
| 2006/0179476 | A1 | 8/2006 | Challener et al. |
| 2006/0224846 | A1 | 10/2006 | Amarendran et al. |
| 2007/0067363 | A1 | 3/2007 | Cooper et al. |
| 2007/0083922 | A1 | 4/2007 | Reiner |
| 2007/0112574 | A1 | 5/2007 | Greene |
| 2007/0174388 | A1 | 7/2007 | Williams |
| 2008/0005221 | A1 | 1/2008 | Irlam et al. |
| 2008/0083009 | A1 | 4/2008 | Kaler et al. |
| 2008/0183603 | A1 | 7/2008 | Kothari et al. |
| 2008/0212782 | A1 | 9/2008 | Brettle et al. |
| 2008/0244092 | A1 | 10/2008 | Kosaka et al. |
| 2008/0288575 | A1 | 11/2008 | Larson |

(56) References Cited

U.S. PATENT DOCUMENTS

| | | |
|---|---|---|
| 2009/0292779 A1 | 11/2009 | Edlund et al. |
| 2009/0319534 A1 | 12/2009 | Gokhale |
| 2010/0088166 A1 | 4/2010 | Tollinger |
| 2010/0180047 A1 | 7/2010 | Surma et al. |
| 2011/0072486 A1 | 3/2011 | Hadar et al. |
| 2012/0150818 A1 | 6/2012 | Vijayan Retnamma et al. |
| 2012/0150826 A1 | 6/2012 | Vijayan Retnamma et al. |
| 2014/0181983 A1 | 6/2014 | Hart |
| 2016/0217786 A1 | 7/2016 | Jablokov et al. |
| 2019/0068530 A1 | 2/2019 | Pamidiparthi |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 1999/012098 | 3/1999 |
| WO | WO 2006/052872 | 5/2006 |
| WO | WO 2006/088915 A1 | 8/2006 |
| WO | WO 2013158764 A1 | 10/2013 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, New York, US, pp. 1-15 (May 1991).

* cited by examiner

SYSTEM AND METHOD FOR MONITORING, BLOCKING ACCORDING TO SELECTION CRITERIA, CONVERTING, AND COPYING MULTIMEDIA MESSAGES INTO STORAGE LOCATIONS IN A COMPLIANCE FILE FORMAT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

The inventions described herein relate to electronic communication systems. More particularly, the inventions described herein relate to systems and methods for monitoring messages in electronic communication systems that allows network operators to define and identify messages of interest, classify and organize those messages to efficiently store them to facilitate subsequent retrieval, auditing or compliance inquiries.

Currently, corporate environments provide numerous forms of electronic communication. For example, corporate employees may communicate internally or with others outside the company through telephones, videophones, voicemail, email, text messages, instant messages, or through electronic collaboration applications such as chat rooms or online blogs. In many cases, these messaging solutions may further include imbedded content such as audio, video or text based attachments that convey or otherwise communicate the desired information, with the messaging application merely acting as a delivery agent.

Such messaging applications can be divided into two general groups, synchronous and asynchronous. Synchronous messaging typically involves a substantially instant dialogue between the communicating parties. Asynchronous messaging, on the other hand, involves monologue-based messages between the communicating parties, which are stored in a known location and may be later accessed by the receiving party to review and respond.

Synchronous messaging is still primarily carried out using PBX (Private Branch Exchange) or PSTN (public switched telephone network) networks. With the advent of commercially viable data oriented messaging solutions, more and more synchronous communications are occurring over the Internet in different forms. Some of the most popular type of synchronous messaging include IM (instant messaging), and VoIP (Voice over Internet Protocol) involving streaming audio/video technologies.

Asynchronous messaging is mostly carried out using commercial messaging systems, which involve electronic mailing (e.g., email or SMTP server). These types of messaging systems usually have central storage locations, such as an email or other messaging server, which is frequently administered by the business entity using them.

Synchronous messaging platforms using analog communication technologies remain fairly common. Although data oriented communication, such instant messaging and VoIP, is becoming increasingly popular, it has not fully superseded traditional methods of device based communication (e.g., PSTN telephone communication). As a result, a new blend of communication solutions are being generated, where data oriented communication mechanisms complement the traditional legacy networks. These approaches create numerous possible messaging configurations in which data oriented networks control traditional, and enable messaging between the two. Solutions are being created that integrate these networks and add more sophisticated features into the combination so as to increasingly transform conventional device interaction to individual interaction.

One class of such solutions includes instant messaging applications that promote optimum network use which increases performance of the IM application. Peer to peer (P2P) protocols have been used in this scenario, which provide direct host to host connections between the participants using optimized network paths. Many consumer applications in this sector use proprietary P2P protocols. Such applications tend to be centered on the individual. Administration of these applications may be difficult for network operators, especially in connection with certain management functions such as resource allocation or regulatory compliance. In addition, these applications do not fit neatly within the existing information structures of the corporate networks, thus making collaboration application limited.

A second class of applications prefers centralized synchronous messaging applications. In these applications, the organization may exert control over the communications environment from a compliance or management perspective, which may be easily integrated with its own corporate networks as well as partner networks. This may allow users to gain access to corporate enabled features such as security, compliance and effective policy applications for the administrators, while at the same time allowing use of corporate identity management features to locate people connected to the network. Client/server applications are used in these systems, and a set of protocols are being developed based on the standards.

Although the emergence of these various forms of electronic communication, and their integration into one another have generally improved productivity, no central management system exists to monitor, coordinate or otherwise administer or oversee such communications. As a result, IT managers tend to administer each of these communication technologies separately, which causes significant inefficiencies when attempting to implement corporate data management or communication polices.

For example, regulatory requirements increasingly require businesses to comply with data retention and administration standards that help complete an audit (usually by external audit agencies) of the activities undertaken by individuals involved in the business. One important activity performed in the course of conducting the business is the various forms of electronic messaging. Accordingly, auditors are frequently interested in examining the entire body of electronic messages relating to certain aspects of the business irrespective of the particular communication platform (s) used. Thus, it would be desirable to have the capability to define and identify electronic messages of interest within a business enterprise and store them such that they can easily be retrieved and examined in connection with an audit or other inquiry.

Furthermore, company management may wish to restrict, limit or otherwise be aware of communications relating to certain subject matter or among certain parties in order to ensure compliance with established communication policies or other administrative or legal restrictions. Thus, it would be further desirable to have the capability to define and identify electronic messages of interest before, during, or after a communication session so that any appropriate action may be taken (restrict communication, tag and store message as relevant to one or more topics or areas of inquiry, etc.).

SUMMARY

The present inventions relate systems and methods for monitoring and managing electronic messages in one or more computer networks. More particularly, the systems and methods of the present invention provide a substantially global or unified approach to messaging management within one or more computer networks that allows network administrators or other authorized users to define and identify electronic messages of interest within the network and store selected messages such that they can be retrieved and examined in connection with an audit or other inquiry.

In addition, aspects of the present invention provide systems and methods that may restrict, limit or otherwise identify communications relating to certain subject matter or among certain parties in a computer network to promote or ensure compliance with established communication policies or other administrative or legal restrictions associated with electronic communication. One way this may be accomplished is by defining and identifying electronic messages of interest before, during, or after a communication session so that any appropriate action may be taken (restrict communication, tag and store message as relevant to one or more topics or areas of inquiry, etc.).

One embodiment of the invention may include a computer-usable medium having stored therein computer-usable instructions for a processor, wherein said instructions when executed by the processor cause the processor to: initiate and administer a messaging session between two to or more clients a with communication server; create a compliance policy for defining messages of interest; and configure a compliance agent to monitor the messaging session, identify messages of interest within the messaging session and direct storage of identified messages, wherein the compliance agent determines a file format of the identified messages and optionally converts identified messages to a file format specified in the compliance policy.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE PREFERRED EMBODIMENT

Figure 1:
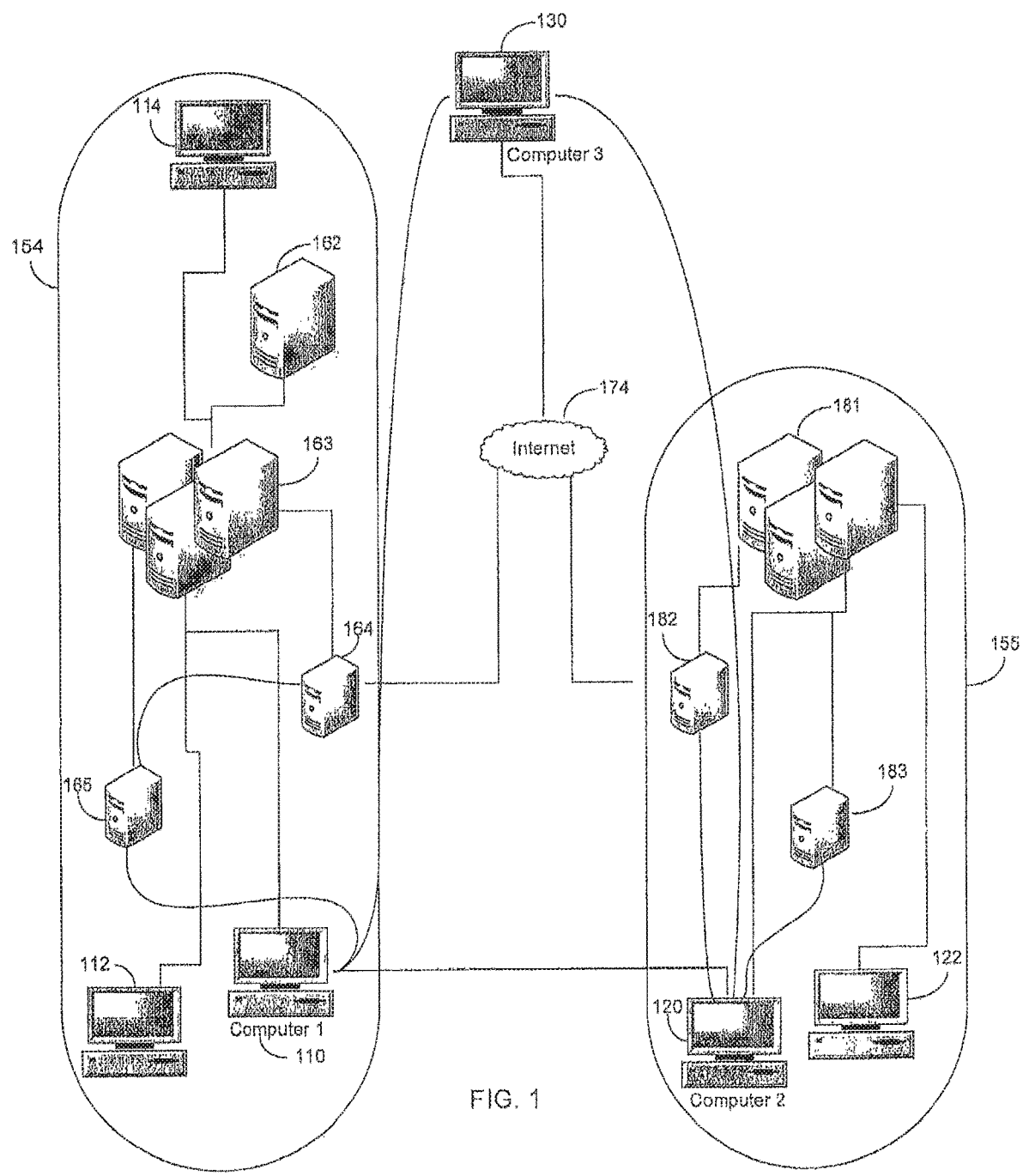
FIG. 1 illustrates a schematic block diagram of an electronic communication system constructed in accordance with the principles of the present invention.

The present inventions relate systems and methods for monitoring and managing electronic messages in one or more computer networks. More particularly, the systems and methods of the present invention provide a substantially global or unified approach to messaging management within one or more computer networks that allows network administrators or other authorized users to define and identify electronic messages of interest within the network and store selected messages such that they can be retrieved and examined in connection with an audit or other inquiry.

In addition, aspects of the present invention provide systems and methods that may restrict, limit or otherwise identify communications relating to certain subject matter or among certain parties in a computer network to promote or ensure compliance with established communication policies or other administrative or legal restrictions associated with electronic communication. One way this may be accomplished is by defining and identifying electronic messages of interest before, during, or after a communication session so that any appropriate action may be taken (restrict communication, tag and store message as relevant to one or more topics or areas of inquiry, etc.).

Although the present inventions are illustrated herein in connection with a computer network associated with a business or corporate enterprise, it will be understood that they are equally applicable to any suitable LAN or WAN type network that has one or more electronic messaging systems and may include other entities such small businesses and/or individual users. Moreover, it will be further understood that such computer networks may be portions of larger networks within a given enterprise and that aspects of the present invention may be selectively deployed to any suitable portion of such networks defined or specified by a network administrator, including certain business units, specific users or other organizational groups.

For example, it may be desired to identify and monitor electronic messages associated with certain groups such as accounting, legal, compliance, management, IT, technical groups, or administrator defines groups, etc. Other selective applications may include specific people with such groups and may further specify other criteria such as subject matter, time of day, messaging application, etc. Such groups need not be pre-existing (e.g., such as email groups) and may be defined as further described herein.

Furthermore, the solutions described herein are applicable to a wide variety of electronic communication systems which include both the synchronous and asynchronous communication technologies mentioned above. In some embodiments, the present invention may be constructed as one or more data structures or software modules, such as a monitoring or compliance agent, which are deployed to various computing or communication platforms with a given network for monitoring, identifying and subsequently directing storage and/or retrieval of certain electronic messages.

One embodiment of the invention is concerned with the administration of messaging systems which use the Session Initiation Protocol (SIP) to initiate and control messaging between a given source and destination. This may include communication networks that support or provide two-party or multiparty multimedia communication sessions such as voice and video calls over the Internet or other communications network. It may also include systems which provide video conferencing, streaming multimedia distribution, instant messaging, presence information and gaming applications. Moreover, such messaging systems may also support some or all of the advanced communication features present in SS7 (Signaling System 7) networks and interact with other data transfer protocols such as the Session Description Protocol (SDP) and Real-time Transfer Protocol (RTP).

In such embodiments, aspects of the invention may reside in (or interoperate with) certain SIP control agents such as SIP User Agents (SIP UAs) including User Agent Client (UAC) or User Agent Server (UAS) modules which may be modified and/or monitored to determine the initiation of a communications session and to identify messages of interest. With this approach, software modules, such as monitoring or compliance agents may be selectively deployed to one or more clients and/or servers to monitor and identify messages of interest.

Furthermore, embodiments of the invention may also interact with other legacy communication platforms such as standard PBX and PSTN networks. This may be accomplished using any suitable software or other intermediate control and/or interface logic that preferably seamlessly interoperates with such legacy networks to provide both legacy and/or more sophisticated voice and data communication service. One example of such software is Office Communication Server (OCS) from Microsoft Corporation. However, any other similar software or logic may be used, if desired.

FIG. 1 illustrates a schematic block diagram of a computer network, constructed in accordance with the principles of the present invention. As shown, system 100 includes a plurality of clients, which may clients 110, 112, 114, 120, 122 and 130. These clients may be any suitable client device such a personal computer, network terminal, or mobile client device including a cell phone, smart phone, PDA and like. In operation, communication servers 164 and 182 manage the instantiation, data transfer and termination of one or more messaging sessions between the clients.

The embodiment illustrated in FIG. 1 may represent a portion of a computer network 100 commonly found in a corporate or business environment. Client computers 110, 120 and 130 may be disparate geographic locations as the computer network may cover several different office locations. For example, network 154 may represent a LAN in the New York office of a business while network 155 represents a LAN in the San Francisco office. Computer 130 may represent a remote computer such an employee telecommuting from home or while on a business trip. As shown, network 100 may provide one or more synchronous messaging applications, with communication server 164 and 182 being SIP-enabled.

In the illustrated embodiment, communication servers 164 and 182 may include Microsoft Office Communications Server (OCS) or other suitable software or logic for interacting with the various different communication technologies. LAN 154 may further include domain management devices 163 and compliance agents 162 and 165 (described in more detail below). Similarly, LAN 155 may further include domain management devices 181 and compliance agent 183. Other embodiments of the present invention may use a communication server with similar functionality other than an OCS.

In some embodiments, the client computers may include certain client applications for initiating, managing, and terminating communication sessions through servers 164 and 182. Such applications may include Office Communicator, also developed by Microsoft Corporation (however any similar suitable application or logic may be used, if desired). This type of client/server application combination (e.g., OCS and Office Communicator) preferably allows conventional and data oriented networks interoperate with each other, with network transitions being substantially seamless through automated policies built into the applications that route the calls or other communications automatically based on user preferences.

Other similar protocols which may be used in conjunction with the present invention include, but are not limited to: 'Jabber & XMPP'; .H323; MGCP; and RTP (for voice and video communication) and Jingle which is an extension to XMPP. Although these applications use a central server to access presence information and routing information, real time communication (media transport or audio/video) occurs peer to peer, in part because of the complexities that arise from bandwidth usage and bottleneck avoidance in the networks. Moreover, certain applications are used where only the text portion of a message can be captured in the central server. Examples include, but are not limited to, Microsoft Office Communications Server, and FaceTime®.

As mentioned above, communication servers 164 and 182 may manage the instantiation, administration and termination of messaging session(s) between two or more participants. Both the participants may be within the same domain or different domains in the same organization. In FIG. 1, each LAN 154 and 155 represent different domains within the same organization.

In operation, any of clients, including computers 110, 120 or 130 may initiate a communication or messaging session. For example, client 130 may initiate an instant messaging session with client computers 110 and 120. In this case, the IM request may pass through Internet 174 and to client 110 through communications server 164 and similarly to client 120 through communications server 182. Such a communications session may also further include audio (e.g., through VoIP) and/or a video component. Network routing and management of the communications session may be managed through the client and server applications described above.

Network administrators may desire to track such communications in order to comply with established communications policies or regulatory requirements. One way this may be accomplished is by monitoring communications including message contents to determine whether they fall into categories that may be relevant to applicable policies, relate to certain subject areas or are relevant to other types of inquiries, such as regulatory or financial inquiries.

Such relevant subject matter may be defined by network administrators or other authorized network users. For example, a network administrator in consultation with management and legal advisors may define types of messages or message content and/or communications that are of interest or need to be stored, restricted or prevented. Such subject matter may also be in the form of pre-existing data management policies or preferences. This information may entered or uploaded a through an editing or compliance program interface specifically designed for this task (not shown) and may include pull down menus and other pre-defined default setting based on the type of business involved. For example, regulatory or auditing requirements vary from business to business. A brokerage house has different compliance and retention needs than a hospital, which as different needs from a drug manufacturer or law firm. Default categories may be automatically selected based on the type of business identified. These defaults may be further supplemented based on an analysis of network configuration or communication technologies used (typically during installation).

Examples of how such content may be defined includes, but is not limited to, user-specified keywords or subject matter definitions (e.g., financial, legal, technical, marketing, budget, investor relations, corporate compliance, etc.) content type, attachment type, etc. Other criteria that may be considered includes: author, point of origination, destination (chat room, bulletin board, etc.) recipient(s), time of day, communication application used, etc. Such groups need not be pre-existing (e.g., such as email groups) and may be defined as further described herein.

Thus, initially, a network administrator may define content and other message attributes of interest for storage and retrieval during a subsequent compliance inquiry. One way this may be accomplished by creating one or more "compliance policies" that set forth subject matter of interest and define what steps are to be taken with messages that satisfy the defined criteria (i.e., specify storage paths and locations, data format and/or conversion preferences, specify data retention criteria, whether such information is confidential and access is limited to a certain authorized individuals, etc.). Such compliance policies may be any suitable data structure, software module, computer code or other application suitable for performing the tasks further described herein.

Afterwards, these preferences may be communicated to (or converted into) filters or recognition and processing routines that are deployed as part of customized compliance or monitoring agents within network 100. Such compliance or monitoring agents are shown in FIG. 1 as agents 162, 165 and 183.

Although these agents are depicted as residing on independent hardware platforms, it will be understood that such agents may physically reside on, or be distributed to, any suitable computing device(s) in network 100 such as client computers, communications servers or domain devices. Moreover, it will be further understood that such monitoring agents may be embodied as software, firmware or any other logic capable of performing the functions described herein. For example, in some embodiments, the agents may be deployed as part of (or in place of) UAC or UAS agents. Moreover, such agents may also be embodied as one or more client or sever-side "bots" which to act to index and transmit content from one point to another. In some embodiments, such bots may include one or more media bots and/or remote file management bots.

Thus, after monitoring criteria are established, compliance agents may be distributed (or updated) throughout network 100. Initially, this may be done as part of an application installation routine, with updates being distributed periodically (e.g., as regulatory requirements or message definitions are changes or updated). During the installation routine, specific hardware information may be collected through auto-discovery or other known network analysis techniques and compliance agents may be installed in the appropriate network locations based on the results of that analysis.

During ensuing communication sessions, the content of various messages traveling within network 100 may be monitored based on the established criteria. Messages such as text-based messages and attachments that meet the defined criteria are identified and then stored in certain memory locations or database within the network. This storage medium may be selected such that it may be easily or quickly accessed or dedicated to a compliance or auditing function to ensure data integrity. Such a memory or archiving device may be located in, or associated with, domain devices 163 or 181. As mentioned above, the storage path and storage device for a given message may be specified by the applicable compliance policy.

In the case where messages include audio or video components, such information may be converted to text format and stored along with the native media file for future use. For example, a text message may include a video having an associated audio component attachment. If the text message is identified as relevant by a compliance agent, the attachment may be converted to text by passing it through speech recognition software. The converted text file may be added to the text message along with the raw video file and placed saved in memory for future examination.

Moreover, in some embodiments where messages have limited or no text content but include multimedia attachments, those attachments may be buffered or copied to an intermediate memory location and examined as described above to determine whether they include relevant information. Messages that do not meet the selection criteria are removed or deleted. Messages that are selected as relevant re then forwarded to the appropriate compliance database or storage medium.

In some embodiments, network 100 may perform certain memory management functions on stored messages to improve search and retrieval functions and to reduce or eliminate duplicative information. For example, network 100 may employ certain data de-duplication measures such as single instance storage technologies to remove duplicative information. For example, in the case where client computer 110 is in communication with client computer 120, some or all of the same messages may be tagged and stored by both compliance agent 165 and compliance agent 183. Such duplicative information may be identified by one or more computers in domain device$ and 163 and 181 and removed such that one copy of this message remains rather than multiple copies in each domain.

Moreover, in some embodiments, compliance agents and/or domain devices may perform certain data conversion routines on identified messages to reduce the number of different file format types stored within network 100. For example, some or all audio messages may be converted to a common popular compressed file format such as MP3 to conserve memory and ensure ease of playback and future compatibility. For example, WAV, PCM, AA3 or other audio file types may be identified and then converted to MP3 files prior to (or sometime after initial) storage. Video files may be treated similarly. Moreover, word processing or spreadsheet file types may be identified and converted to a common file type or may be converted to text files. For example, WordPerfect files may be converted to MS Word files or to ASCII or text files, etc.

Additional features provided by the present invention may include real-time monitoring of messages to prevent or prohibit certain types of communication. For example, a company may wish to prevent its employees from visiting chat rooms or posting to message boards while at work. In this case, the network administrator may define these types of transactions as prohibited through a compliance policy or communication restriction. Thus, if an employee attempts to send a text message, email or other communication to these destinations, a copy of that message may be stored and management alerted to this transaction. Furthermore, a warning or reminder screen may appear prior to (or after) the message is sent informing the user that the contemplated action is in violation of established communication policies. In some embodiments, the action may be blocked.

A similar procedure may be used to prohibit communications within an enterprise or to make management aware of such communications. For example, a group of investment advisors in one location may be prohibited from communicating with a group of investment advisors at another location. Thus, if an employee of the first group attempts to send a text message, email or other communication to the second group, a copy of that message may be stored and management alerted to this transaction. Furthermore, a warning or reminder screen may appear prior to (or after) the message is sent informing the user that the contemplated action is in violation of established communication policies. In some embodiments, the action may be blocked and further such communications prevented.

Figure 2:
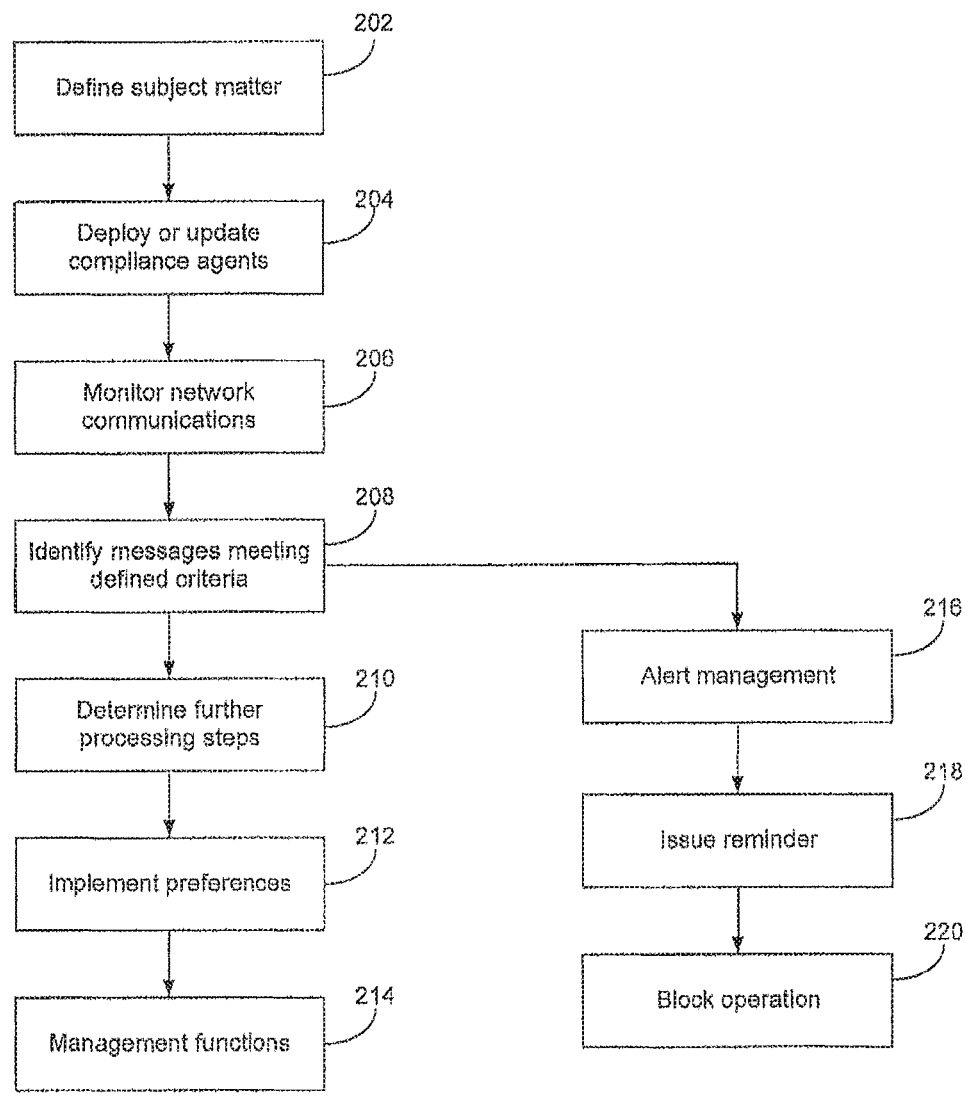
FIG. 2 is a flow chart illustrating some of the steps involved in monitoring and selectively storing certain electronic messages in accordance with an embodiment of the present invention.

FIG. 2 is a flow chart 200 illustrating some of the steps associated with the monitoring and storing of electronic messages in accordance with an embodiment of the present invention. Initially, at step 202, a network administrator or other authorized user may define subject matter or communication attributes that will trigger a storage response from compliance agents within network 100. As mentioned above, this may include user specified keywords, subject matter, content type, attachment type, etc. Other criteria that may be considered includes author, point of origination, destination recipient(s), time of day, communication application used, etc. Such groups need not be pre-existing and may be defined as further described herein.

This may be accomplished by creating one or more compliance policies that set forth subject matter of interest and define what steps are to be taken with messages that satisfy the defined criteria. Subsequently, the preferences specified in these policies may be communicated to (or converted into) filters or recognition and processing routines that are deployed as part of customized compliance or monitoring agents within network 100 (step 204).

Next, at step 206, the compliance agents may monitor communication within a specified network for messages that meet the defined criteria. This may be accomplished using any suitable active or passive data monitoring technique known in the art such as IGMP or DCHP snooping of data packets or by directly comparing characters in payload sections of messages to the defined keywords or topics of interest. In some embodiments, the compliance agent may add itself to the communication link such that substantially all data passes through it so that the data can be monitored in real time. In other embodiments, message data may be copied for analysis, and the compliance agent may operate in parallel with the communication link.

Next, at step 208, the compliance agents identify messages that meet the criteria specified in the compliance policies. At this point, the compliance agents may refer to the applicable compliance policy to determine what further steps need to be performed on the identified messages (step 210). For example, in some embodiments, the compliance policy may specify the storage path, database or memory location to store that message. Because the various compliance definitions may be applicable to different regulations or auditing inquiries, different messages may have different storage locations, retention criteria, confidentiality designations etc. Moreover, the compliance policy may specify certain format or conversion preferences for the identified message.

Next, at step 212, once the data processing preferences have been obtained, those preferences are implemented. For example, this may include converting the format of the message to a format defined in the compliance policy. Further, this may include converting audio and/or video message to text files, which may be indexed and searched for auditing or regulatory compliance purposes. Converted messages may then be stored a in designated memory location and indexed for future retrieval. The storage manager of this procedure may create a message log which identifies each message by certain descriptors such as size, file type, date received, reason message was selected, confidentiality designation, etc.

Next, at step 214, certain memory management functions may be performed on stored messages to improve search and retrieval operations and to reduce or eliminate duplicative information. For example, certain data de-duplication measures such as single instance storage technologies may be employed to remove duplicative information. For example, in the case where one or more client computers in different domains exchange messages, some or all of the same messages may be tagged and stored by compliance agents in both domains. Such duplicative information may be periodically identified and removed such that one copy of this message remains rather than multiple copies in each domain.

Additional features provided by the present invention may include real-time monitoring of messages to prevent or prohibit certain types of communication. For example, a company may wish to prevent its employees from visiting chat rooms or posting to message boards while at work. In this case, the network administrator may define these types of transactions as prohibited through a compliance policy or communication restriction (step 202). Thus, if an employee attempts to send a text message, email or other communication to these destinations, a copy of that message may be stored and management alerted to this transaction (step 216) Furthermore, a warning or reminder screen may appear prior to (or after) the message is sent informing the user that the contemplated action is in violation of established communication policies (step 218). In some embodiments, the action may be blocked (step 220).

Systems and methods described herein may comprise software, firmware, hardware, or any combination(s) of software, firmware, or hardware suitable for the purposes described herein. Software and other modules may reside on servers, workstations, personal computers, computerized tablets, personal digital assistants (PDAs), and other devices suitable for the purposes described herein. Software and other modules may be accessible via local memory, via a network, via a browser or other application in an application service provider (ASP) context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate Aspects of the present inventions described herein may be embodied as computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer system comprising:
    a plurality of first computing devices comprising computer hardware and one or more first storage devices that communicate, wherein the plurality of first computing devices electronically send a plurality of messages to a plurality of destinations via a network, wherein at least a portion of the plurality of messages comprise multimedia messages in different file formats; and
    a plurality of compliance monitoring agents within the network that monitor the plurality of messages, the plurality of compliance monitoring agents comprising at least a second computing device comprising computer hardware that is in communication with the plurality of first computing devices, the plurality of compliance monitoring agents configured to:
        block a first multimedia message that meets a selection criteria from being sent to an intended destination; and
        direct storage of a copy of the first multimedia message that meets the selection criteria by automatically directing a conversion of the copy of the first multimedia message into a compliance file having a compliance file format, and store the compliance file in a storage device specified in a compliance policy.

2. The computer system of claim 1, further comprising a Session Initiation Protocol (SIP) server configured to initiate and administer instant messaging sessions associated with the plurality of messages.

3. The computer system of claim 1, further comprising a speech recognition module configured to convert an audio data portion of the first multimedia message into converted text.

4. The computer system of claim 1, wherein the compliance policy specifies a confidentiality designation for one or more of the plurality of messages.

5. The computer system of claim 1, wherein one or more of the plurality of messages are conveyed by a public switched telephone network (PSTN) or a private branch exchange (PBX) network.

6. The computer system of claim 1, wherein the plurality of compliance monitoring agents are further configured to determine that text associated with the copy of the first multimedia message is not in a compliance file format type specified in the compliance policy, and to convert the text associated with the first multimedia message into the compliance file format type.

7. The computer system of claim 1, wherein a type of the compliance file format comprises one or more of the group consisting of MS Word, WordPerfect, and an American Standard Code for Information Interchange (ASCII).

8. The computer system of claim 1, wherein the plurality of compliance monitoring agents further comprise a Session Initiation Protocol User Agent or a Session Initiation Protocol User Agent Client.

9. The computer system of claim 1, further comprising a de-duplicating agent configured to de-duplicate the copy of the first multimedia message stored in the designated storage.

10. The computer system of claim 1, wherein the compliance policy incorporates legal or regulatory requirements.

11. A method of processing electronic messages in a computer system, comprising:
    with at least one computing device comprising computer hardware and one or more first storage devices:
        monitoring, with the plurality of compliance monitoring agents, a plurality of messages sent to a plurality of destinations via a network, wherein at least a portion of the plurality of messages comprise multimedia messages in different file formats;
        blocking a first multimedia message that meets a selection criteria from being sent to an intended designation; and
        directing a conversion of a copy of the first multimedia message that meets the selection criteria into a compliance file having a compliance file format, and storing the compliance file in a designated storage specified in a compliance policy.

12. The method of claim 11, further comprising a Session Initiation Protocol (SIP) server configured to initiate and administer instant messaging sessions associated with the plurality of messages.

13. The method of claim 11, comprising converting an audio data portion of the first multimedia message into converted text.

14. The method of claim 11, wherein the compliance policy specifies a confidentiality designation for one or more of the plurality of messages.

15. The method of claim 11, further comprising conveying one or more of the plurality of messages over a public switched telephone network (PSTN) or a private branch exchange (PBX) network.

16. The method of claim 11, further comprising determining that text associated with a copy of the first multimedia message is not in the compliance file format, and converting the text associated with the first multimedia message into the compliance file format.

17. The method of claim 11, wherein a type of the compliance file format comprises one or more of the group consisting of MS Word, WordPerfect, and American Standard Code for Information Interchange (ASCII).

18. The method of claim 11, further comprises a Session Initiation Protocol User Agent or a Session Initiation Protocol User Agent Client that monitors the plurality of messages.

19. The method of claim 11, further comprising de-duplicating the copy of the first multimedia message.

20. The method of claim 11, wherein the compliance policy incorporates legal or regulatory requirements.

\* \* \* \* \*